United States Patent [19]

Mittenthal

[11] Patent Number: 5,214,704
[45] Date of Patent: May 25, 1993

[54] NONLINEAR DYNAMIC SUBSTITUTION DEVICES AND METHODS FOR BLOCK SUBSTITUTIONS

[75] Inventor: Lothrop Mittenthal, Thousand Oaks, Calif.

[73] Assignee: Teledyne Industries, Inc., Newbury Park, Calif.

[21] Appl. No.: 741,097

[22] Filed: Aug. 5, 1991

Related U.S. Application Data

[63] Continuation-in-part of Ser. No. 416,953, Oct. 4, 1989, Pat. No. 5,038,376.

[51] Int. Cl.[5] .................................................. H04K 1/04
[52] U.S. Cl. ........................................ 380/37; 380/28; 380/49
[58] Field of Search ................. 380/28, 36, 37, 42, 380/49

[56] References Cited

U.S. PATENT DOCUMENTS

| | | | |
|---|---|---|---|
| 4,195,200 | 3/1980 | Feistel | 380/37 |
| 4,322,577 | 3/1982 | Brändström | 380/37 |
| 4,520,232 | 5/1985 | Wilson | 380/28 |
| 4,685,132 | 8/1987 | Bishop et al. | 380/49 X |
| 4,797,921 | 1/1989 | Shiraishi | 380/28 |
| 4,932,056 | 6/1990 | Shamir | 380/28 X |
| 5,038,376 | 8/1991 | Mittenthal | 380/37 |

*Primary Examiner*—Tod Swann
*Attorney, Agent, or Firm*—Blakely, Sokoloff, Taylor & Zafman

[57] ABSTRACT

Methods and apparatus for nonlinearizing modulo 2 addition based encryption by block substitution techniques which allows use of the substitution scheme with relatively simple hardware and yet makes cryptanalysis more difficult. The basic block substitution, a one to one mapping of n bit binary numbers onto themselves, is based on the fact that certain permutations of the n bit binary numbers define a block substitution by modulo 2 addition of one permuted set of numbers to another, and that a subset of these define equations having an additive relationship when viewed as vectors. This allows the simple changing of the transformation on a frequent basis. Then the equations are nonlinearized, also in an orderly and readily variable manner, so that the remainder of the set equations may no longer be generated from a limited subset of the equations. Various properties of the transformations and methods of using the same are disclosed.

6 Claims, 11 Drawing Sheets

Microfiche Appendix Included
(80 Microfiche, 2 Pages)

OFFSET = 0101

NONLINEAR DYNAMIC SUBSTITUTION DEVICES AND METHODS FOR BLOCK SUBSTITUTIONS

RELATED APPLICATION

This application is a continuation-in-part of application Ser. No. 07/416,953 filed Oct. 4, 1989 now U.S. Pat. No. 5,038,376. This application contains appendices 1-3 for analysis of various block substitution techniques in microfiche form only containing 2 sheets and 80 frames.

BACKGROUND OF THE INVENTION

1. Field of the Invention

The present invention relates to the field of encryption devices and methods, and more particularly, to block substitution encryption methods and devices.

2. Prior Art

In many cases, it is desired to communicate information in digital form from one location to another in a manner which is clear and unambiguous to the receiver, but which is incomprehensible to an interloper therebetween. Accordingly, in many instances, it is common to encrypt the information to be communicated by some predetermined encryption process, to transmit the encrypted form of the information and to then decrypt the information at the receiving location. Depending upon the degree of security desired, a relatively simple and easily broken encryption may be used, as any level of encryption will make the transmission meaningless to the casual interloper. In other situations, the degree of security desired may dictate the use of an encryption technique which is more difficult to decipher by cryptanalysis, or of course hopefully in the highest level of security, make the same substantially impossible to decipher. Applications for such encryption techniques include commercial applications such as sensitive communications between manufacturing plants, bank branches, etc., and military applications including but not limited to IFF (identification friend or foe). While in some cases the primary objective of the encryption is to prevent an interloper from deciphering the information being communicated, in other cases a primary object, such as in IFF, is to prevent the interloper from himself originating false information with the same encryption scheme so as to mislead the intended receiver. Both objectives are frequently present in many applications.

Block substitution is a method used to encrypt a clear text message which is in the form of a sequence of binary numbers. In accordance with the method, the sequence is broken into blocks of some predetermined block length n, with the block substitution device substituting a unique new block of binary numbers for each of those in the clear text. Substitute blocks constitute the encrypted message or cipher text, each substitute block representing a nonambiguous one-to-one transformation of a clear text block. In the prior art, such substitution generally takes place by means of look-up tables, switching arrangements, or feedback shift registers. However, without changing codes or substitution schemes frequently, the encryption may be broken by cryptanalysis, though, changing look-up tables is cumbersome, only a limited number of possible switching arrangements is practical, and repeated cycling of a shift register is time consuming. An additional problem arises in finding substitutions which do not have any pattern or bias in them. At the present time, candidate substitutions are examined by computer simulation for possible systematic patterns and in some cases, additional circuitry is used to compensate therefor.

Various types of encryption equipment and methods are well-known in the prior art. See for instance U.S. Pate. No. 3,796,830, 3,798,359, 4,078,152, 4,195,200, 4,255,811, 4,316,055 and 4,520,232. In general these systems they relate to block substitution are key dependent ciphering and deciphering systems and are not based upon block substitution by modulo 2 addition of one additive permuted set of numbers to another, as in the present invention.

In the parent application, methods and apparatus for modulo 2 addition based encryption by block substitution techniques were disclosed which allow use of the substitution scheme with relatively simple hardware. The block substitution, a one to one mapping of n bit binary numbers onto themselves, is based on the fact that certain permutations of the n bit binary numbers define a block substitution by modulo 2 addition of one permuted set of numbers to another, and that a subset of these define equations having an additive relationship when viewed as vectors, whereby the remainder of the set may be generated from a limited subset of the equations. This allows the simple changing of the transformation on a frequent basis. Various properties of the transformations and methods of using the same were disclosed. The fact that the remainder of the set equations may be generated from a limited subset of the equations, however, may make cryptanalysis less difficult than desired in some applications. Accordingly the present invention comprises a method and apparatus for nonlinearizing the equations, also in an orderly and readily variable manner, so that the remainder of the set equations may no longer be generated from a limited subset of the equations.

BRIEF DESCRTPTION OF THE INVENTION

Methods and apparatus for nonlinearizing modulo 2 addition based encryption by block substitution techniques which allows use of the substitution scheme with relatively simple hardware and yet makes cryptanalysis more difficult. The basic block substitution, a one to one mapping of n bit binary numbers onto themselves, is based on the fact that certain permutations of the n bit binary numbers define a block substitution by modulo 2 addition of one permuted set of numbers to another, and that a subset of these define equations having an additive relationship when viewed as vectors. This allows the simple changing of the transformation on a frequent basis. Then the equations are nonlinearized, also in an orderly and readily variable manner, so that the remainder of the set equations may no longer be generated from a limited subset of the equations. Various properties of the transformations and methods of using the same are disclosed.

BRIEF DESCRIPTION OF THE DRAWINGS

FIG. 1 illustrates a many-one transformation of one set of three bit binary numbers to another set of binary numbers by a modulo 2 addition.

FIG. 2 illustrates a one-to-one transformation of one set of three bit binary numbers to another set of binary numbers by a modulo 2 addition.

FIG. 3 presents the transformation equations of FIG. 2 reordered, excluding the first equation, making the three digit number in the first column the same as the three digit number in the second column of the preceding row. Excluding the first equation, each column now is in the same order but with different starting positions.

FIG. 4 corresponds to FIG. 3, though with the first and third columns shifted vertically with respect to the second column. These shifts are 6 and 2 positions downward respectively. Except for the first equation, each column remains in the same order but with different starting positions.

FIG. 5 corresponds to FIG. 4, with the $\oplus$ and $=$ symbols interchanged for encryption purposes.

FIG. 10 presents a set of transformation equations corresponding to those of FIG. 4 with the fixed word 001 added to columns 1 and 2 thereof. Except for the first equation, columns 1 and 2 are in the same order but with different starting positions.

FIG. 15 illustrates a rearrangement equations in FIG. into the general form $x_{n-1} \oplus x_n = z_n$.

FIG. 17 illustrates a set of equations useful for encryption and decryption derived by adding the offset 0101 to the first and second columns of the set of equations presented in Table 18 of Appendix A in Appendix 2.

DETAILED DESCRIPTION OF THE INVENTION

Figure 6:
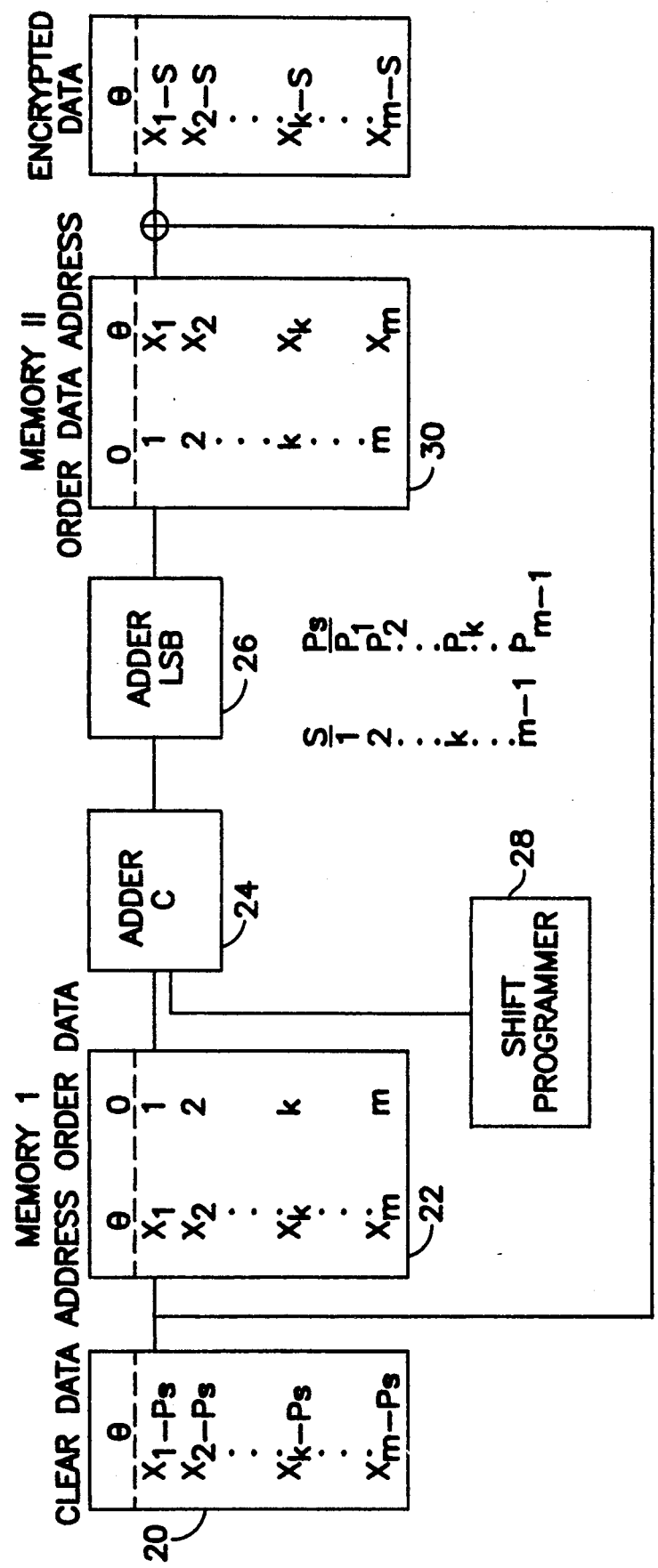
FIG. 6 is a block diagram of an apparatus for encrypting data.

Since the present invention comprises methods and apparatus for nonlinearizing the modulo 2 addition based encryption by block substitution described in detail in parent application, that disclosure is repeated herein to provide a basis for the improvement of the present invention. Thus as described in the parent application, in the description to follow, the methods and apparatus of the parent application will first be described with respect to blocks of n bit binary numbers where the value of n is 3. Then the methods and apparatus will be expanded to n bit blocks generally, and certain characteristics of blocks up to $n = 8$ will be presented. By presenting the following example for $n=3$, it is believed that the concepts of the original invention may be better understood than would be the case if a larger block having many more combinations were used.

Block substitution is the term usually applied to a one-to-one mapping of the n-bit binary numbers onto themselves.

This mapping can be written as a pairing of the $2^n$ n-bit numbers:

| | |
|---|---|
| $X_1$ | $Z_1$ |
| $X_2$ | $Z_2$ |
| . | . |
| . | . |
| $X_k$ | $Z_k$ |
| . | . |
| . | . | where each column is the set of the same $2^n$ distinct n-bit numbers but written in different orders. Thus, this mapping can be thought of as a permutation of the n-bit numbers written as:

| | | |
|---|---|---|
| $X_1$ | $X_2$ | $\ldots X_k$ |
| $Z_1$ | $Z_2$ | $\ldots Z_k$ | or $(X_1 X_i X_j)$ for some set of indices. This usual notation for permutations simply means that $X_1 \rightarrow X_i$, $X_i \rightarrow X_j$, etc.

Going back to the column notations, one could define a set of simple equations from the original set and its image:

| | |
|---|---|
| $Y_1 \oplus X_1 =$ | $Z_1$ |
| $Y_2 \oplus X_2 =$ | $Z_2$ |
| . | . |
| . | . |
| $Y_k \oplus X_k =$ | $Z_k$ |
| . | . |
| . | . | where $\oplus$ means modulo 2 addition (i.e., addition of corresponding digits without any carry). In general, the set $(Y_1, Y_2, \ldots)$ will not all be distinct, but in certain circumstances they will be. In accordance with the original invention, when they are distinct, block substitutions can be generated by modulo 2 addition rather than by conventional means. The main tasks are to determine the circumstances, if any, in which this scheme works, how the substitutions can be quickly changed, and the lack of bias.

Figures 1, 2, 3, 4, 5, 10:
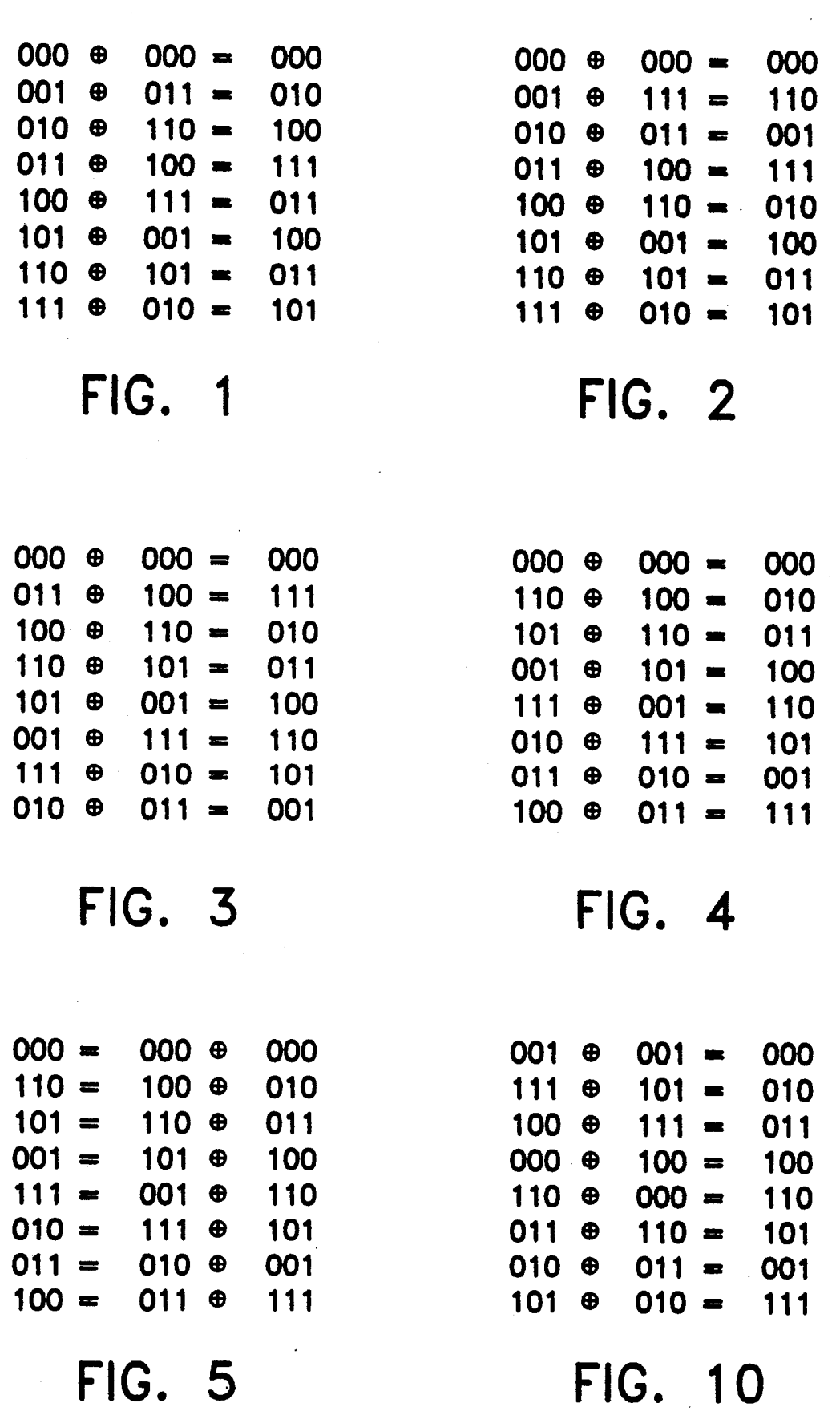

It is not obvious that block substitutions can ever be generated by modulo 2 addition. For example, consider the attempt to substitute one arrangement of 3-bit binary numbers for another by modulo 2 addition shown in FIG. 1. In column 3 on the right, 011 and 100 each appear twice, while 001 and 110 never appear. The numbers in column 1 on the left, acting on the numbers in column 2 in the center, constitute a transformation of the set of 3-bit binary words of column 1 into themselves. This is a many-one transformation and is useless for block substitutions because of the ambiguity that results when trying to recover the original block for the transformed blocks 011 and 100.

Trying another arrangement as shown in FIG. 2 gives a different result. Any pair of columns now constitutes a one-to-one transformation. In particular, the transformation is one-to-one from the 3-bit binary numbers of column 3 (the clear text) onto themselves, the encrypted text of column 1. Each column consists of all the 3-bit numbers exactly once.

Obviously, one could use the transformations of FIG. 2 to transform any three digit binary block into an encrypted binary block, and of course use the same equations to de-encrypt the encrypted message by finding the encrypted word in column 1 and then selecting the corresponding clear text word in the same row, column 3 of FIG. 2. This is most convenient if ⊕ and = are interchanged as shown in FIG. 5. An equivalent transformation to transform the encrypted word back to the clear text word results if the words of column one are added to those of column two to obtain those in column three.

Referring again to FIG. 2, an interesting property of the transformation shown therein, and for that matter, for all transformations of the type of interest herein, may be seen. In particular, of the eight blocks of three binary numbers, the lower four blocks 000, 001, 010 and 011 map into two blocks of the lower four, namely 000 and 001, and two blocks of the upper four, namely 110 and 111. Similarly of course, the four larger blocks of the eight map two into blocks in the lower four, and two into blocks of the upper four. Similarly, the even blocks 000, 010, 100 and 110 map into two even blocks, 000 and 010, half into odd blocks and half into even blocks. Obviously for decryption, the same is true. Thus, knowledge of some characteristic of the encrypted block such as its being large, small, even, odd, etc., does not convey any similar knowledge of a characteristic of the unencrypted block. As a result of this, the encryption is said to be unbiased. For that matter it should be noted that, even considering the middle digit of each block, the four blocks of FIG. 2 having a zero as the middle digit map two blocks into blocks also having a zero as a middle digit, and two blocks having one as the middle digit. Similarly of course, the four blocks having a one as the middle digit map two into blocks having a one as a middle digit, and two into blocks having a zero as the middle digit. This property applies to all block sizes and extends to dividing equally all set of blocks which may be characterized algebraically as maximal subgroups. This unbiased character of the encryption is a highly beneficial characteristic of the encryption scheme disclosed herein, particularly in conjunction with the frequent changing of the encryption from time to time.

In particular, in any practical encryption device of course, one would like to be able to frequently change the encryption scheme so that patterns will not persist for a sufficient length of time to allow cryptanalysis of the pattern. For this purpose, certain properties of the equations of FIG. 2 may be recognized by rearranging the rows of FIG. 2 as shown in FIG. 3. Rearrangement of the rows in any manner of course does not effect the transformation in any way, as each of the equations maintains its own integrity separate and apart from its position in the table. In essence, the second row of FIG. 3 is the 4th row in FIG. 2 and the third row of FIG. 3 is the fifth row in FIG. 2, with each successive row being arranged so that the left column in each successive row contains the same 3 bit number as the second column of the preceding row. When so arranged, neglecting the first or identity row, it will be noted that each of the three columns contains the same sequence of the 3 bit binary numbers, with wrap-around. In particular, the first column has the same sequence as the second column, but displaced downward therefrom one position (or upward six positions), and the third column has the same sequence as the second column, though displaced downward three positions (or upward four positions) from the sequence of column two.

Neglecting the first row or identity row of FIG. 3 again, if the 3 bit binary numbers in column 1 are shifted downward a total of six positions with wrap-around with respect to the second column, it will be noted that a one to one transformation still results, as shown in FIG. 4. Except for the identity row, the transformation is entirely different from that of FIG. 3. By way of example, 111 column 3 maps into 011 column 1 in FIG. 3, and maps into 100 column 1 in FIG. 4. In addition however, it is important to note that the sequence of the 3 digit numbers in columns 1 and 3 of FIG. 4 (separating out the identify row) is still the same as that in column 2 of FIGS. 3 and 4, though each is shifted with wrap-around in comparison to column 2. Thus, the transformation of FIG. 3 has been changed to the new transformation of FIG. 4 by merely shifting the numbers in the first column of FIG. 3 with respect to those in the second column, and with the numbers in the third column also being shifted with respect to those in the second column, but by a different amount to preserve the integrity of the modulo 2 addition equations. Again, for decryption, symbols ⊕ and = of FIG. 4 can be interchanged as in FIG. 5.

More generally for any block size, the sets of equations can be written as:

| 1 | 2 | 3 |
|---|---|---|
| ENCRYPTION | | |
| $\theta =$ | $\theta \oplus$ | $\theta$ |
| $X_{1-s} =$ | $X_1 \oplus$ | $X_{1-P_s}$ |
| $X_{2-s} =$ | $X_2 \oplus$ | $X_{2-P_s}$ |
| . | . | . |
| . | . | . |
| . | . | . |
| $X_{k-s} =$ | $X_k \oplus$ | $X_{k-P_s}$ |
| . | . | . |
| . | . | . |
| . | . | . |
| $X_{m-s} =$ | $X_m \oplus$ | $X_{m-P_s}$ |
| | | $\theta = 00\ldots00$ |
| DECRYPTION | | |
| $\theta \oplus$ | $\theta =$ | $\theta$ |
| $X_{1-s} \oplus$ | $X_1 =$ | $X_{1-P_s}$ |
| $X_{2-s} \oplus$ | $X_2 =$ | $X_{2-P_s}$ |
| . | . | . |
| . | . | . |
| . | . | . |
| $X_{k-s} \oplus$ | $X_k =$ | $X_{k-P_s}$ |
| . | . | . |
| . | . | . |
| . | . | . |
| $X_{m-s} \oplus$ | $X_m =$ | $X_{m-P_s}$ |

For block size n, $m = 2^n - 1$. $\theta = 00\ldots00$, the n bit word consisting of all zeroes.

If column 1 is shifted by S positions with respect to column 2, then column 3 is shifted by a different amount $P_s$ to preserve the integrity of the modulo 2 addition equations. For a given shift S, $P_s$ is determined by the shift programmer.

Now referring to FIG. 6, a block diagram of a system for carrying out encryption in accordance with the encryption and decryption techniques discussed so far may be seen.

The clear test word is sent to its address in Memory I. This corresponds to selecting a word $X_{k-P_s}$ from column 3 other than $\theta$. The concept is to add it to its counterpart in column 2. If $X_{k-P_s}$ is other than $\theta$ and is to be added to $X_k$, this is equivalent to adding the word with order data $K - P_s$ in column 3 to the word with order $K - P_s + P_s = K$, also in column 3. Thus the order data of the clear test word $K - P_s$ is sent to the adder to be added to $P_s$. The new order number is sent to its address in Memory II. The content of that address is added modulo 2 to the clear test word to obtain the encrypted word $X_{k-s}$ in column 1. If the clear text word is $\theta$, its cipher test image is the same.

Adding of the order data is accomplished by two adders, carry (C) and least significant bit (LSB). The carry adder adds the numbers conventionally with carry, e.g. $001+011=100$. However, if the addition requires more than n digits, that is, a 1 is carried to the $n+1$ position, that extra 1 is instead added to the first position, e.g., $100+110=1010\rightarrow011$. This is accomplished by the LBS adder. This is simply addition modulo m where $m=2^n-1$. In this example, $n=3$, $m=7$ and the addition expressed in decimal terms is $4+6=10\equiv3 \mod 7$ where $100\rightarrow4$, $110\rightarrow6$ and $011\rightarrow3$.

Figure 7:
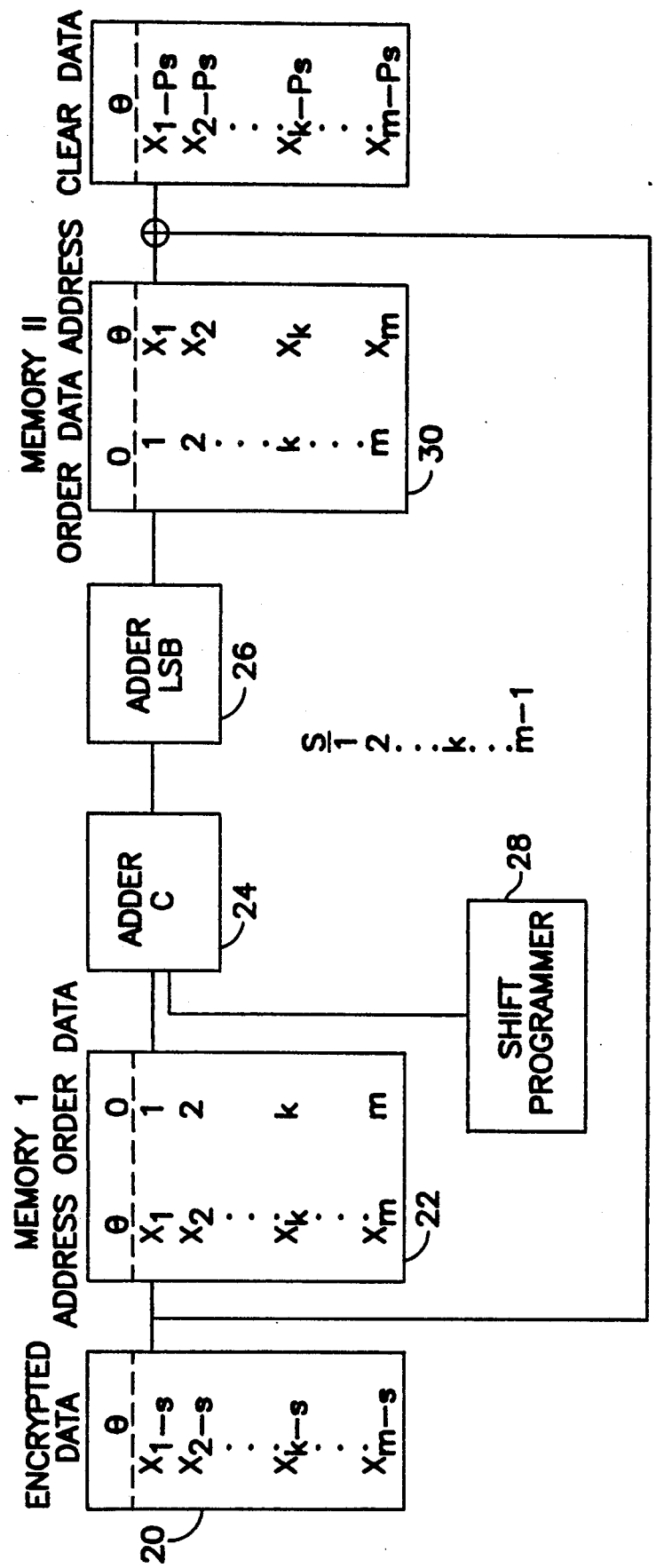
FIG. 7 is a block diagram of apparatus for decrypting data encrypted by the apparatus of FIG. 6.

The block diagram for decryption is shown at FIG. 7. The cipher text word is sent to its address in Memory I. This corresponds to selecting a word $X_{k-s}$ from column 1 other than $\theta$. The concept is to add it to its counterpart, $X_k$ in column 2. This is equivalent to adding $X_{k-s}$ in column 1 to the word with order data $K-s+s=K$, also in column 1. Thus the order data of the cipher text word, $K-s$ is sent to the adder to be added to s. The new order number is sent to its address in Memory II. The contents of that address is added modulo 2 to the cipher text word to obtain the de-encrypted word $X_{k-P_s}$ in column 3. If the cipher text word is $\theta$, it is de-encrypted as $\theta$.

The addition of order data, $K-S+S$ and $K-P_s+P_s$ is understood to be modulo m or with wraparound. That is, if the order data is greater than m, the last position, m is subtracted from the order data. If the cipher text word is $\theta$, it is de-encrypted as the same word.

The shift program determines the order in which the shifts, S, in column 1 are used, with the corresponding $P_s$ shift S in column 3. Any desired order can be used. The shift S corresponds to a power of the basic permutation, which determines the substitution by addition.

Figure 8:
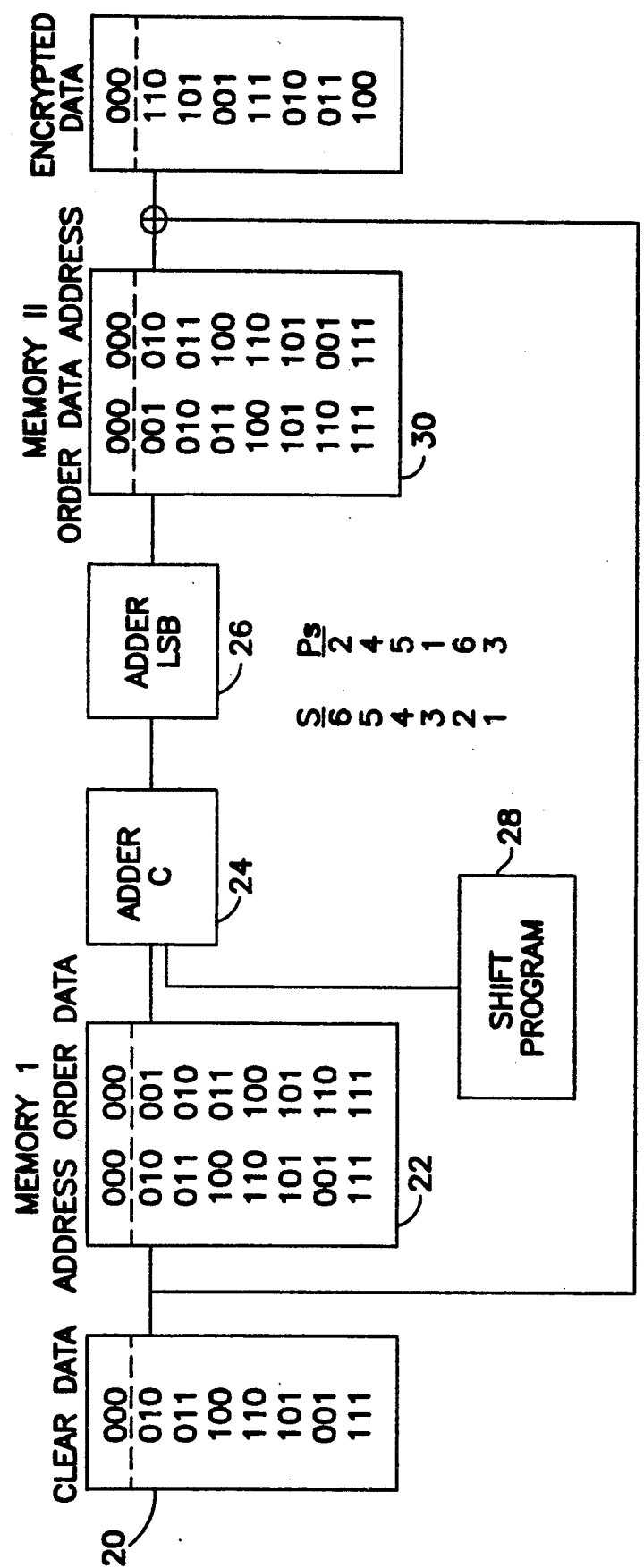
FIG. 8 is an example of encryption using FIG. 6.

Thus, by way of example, in FIG. 8, if the clear data value is 010, then that address in Memory I provides order data 001, which is binary notation that 010 is in position 1 in the sequence in Memory I (column 3 of the set of equations). The first shift position in the program is $S=6$, for which $P_6=2$. To the position of 010, $K-P_6=1$ is added $P_6=2$. In binary notation, $001+010=011$. Corresponding to the address 011 in Memory II is the number 100. (This is equivalent to saying that 100 is in position 3 in column 3). $110=100 \oplus 010$ is the cipher text word. This represents the first of the additive equations in FIG. 5.

Figure 9:
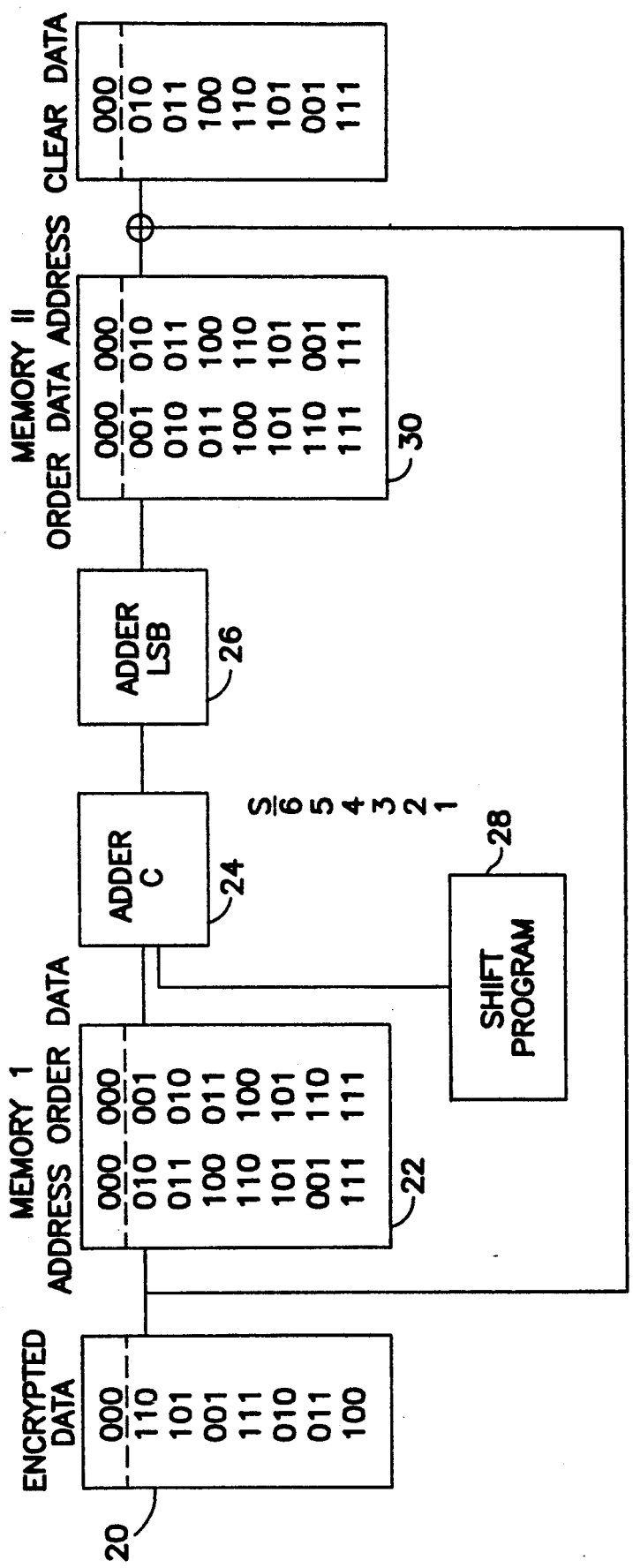
FIG. 9 is an example of decryption using FIG. 7.

For decryption, the cipher text word is 110. In FIG. 9, that address in Memory I provides order data 100, or position 4 in the sequence in Memory I. The first shift position in the program is $S=6$. To the position of 110, $K-6=4$, is added 6, or 110 in binary notation. $4+6=10$. Subtracting by $m=7$, $10-7=3$, or position 3 with wrap around. In binary notation, $100+110=011$ modulo 7. Corresponding to the address 011 in Memory II is the number 100. $110 \oplus 100=010$. This represents the first of the additive equations in FIG. 4.

If one adds Modulo 2 a fixed number to the first and second columns of FIG. 4. A still further one-to-one transformation results.

| 1 | 2 | 3 |
|---|---|---|
| | ENCRYPTION | |
| $(I \oplus Y) =$ | $(I \oplus Y) \oplus$ | I |
| $(X_{1-s} \oplus Y) =$ | $(X_1 \oplus Y) \oplus$ | $X_{1-P_s}$ |
| $(X_{2-s} \oplus Y) =$ | $(X_2 \oplus Y) \oplus$ | $X_{2-P_s}$ |
| . | . | . |
| . | . | . |
| $(X_{k-s} \oplus Y) =$ | $(X_k \oplus Y) \oplus$ | $X_{k-P_s}$ |
| . | . | . |
| . | . | . |
| $(X_{m-s} \oplus Y) =$ | $(X_m \oplus Y) \oplus$ | $X_{m-P_s}$ |
| | DECRYPTION | |
| $(I \oplus Y) \oplus$ | $(I \oplus Y) =$ | I |
| $(X_{1-s} \oplus Y) \oplus$ | $(X_1 \oplus Y) =$ | $X_{1-P_s}$ |
| $(X_{2-s} \oplus Y) \oplus$ | $(X_2 \oplus Y) =$ | $X_{2-P_s}$ |
| . | . | . |
| . | . | . |
| $(X_{k-s} \oplus Y) \oplus$ | $(X_k \oplus Y) =$ | $X_{k-P_s}$ |
| . | . | . |
| . | . | . |
| $(X_{m-s} \oplus Y) \oplus$ | $(X_m \oplus Y) =$ | $X_{m-P_s}$ |

Figure 11:
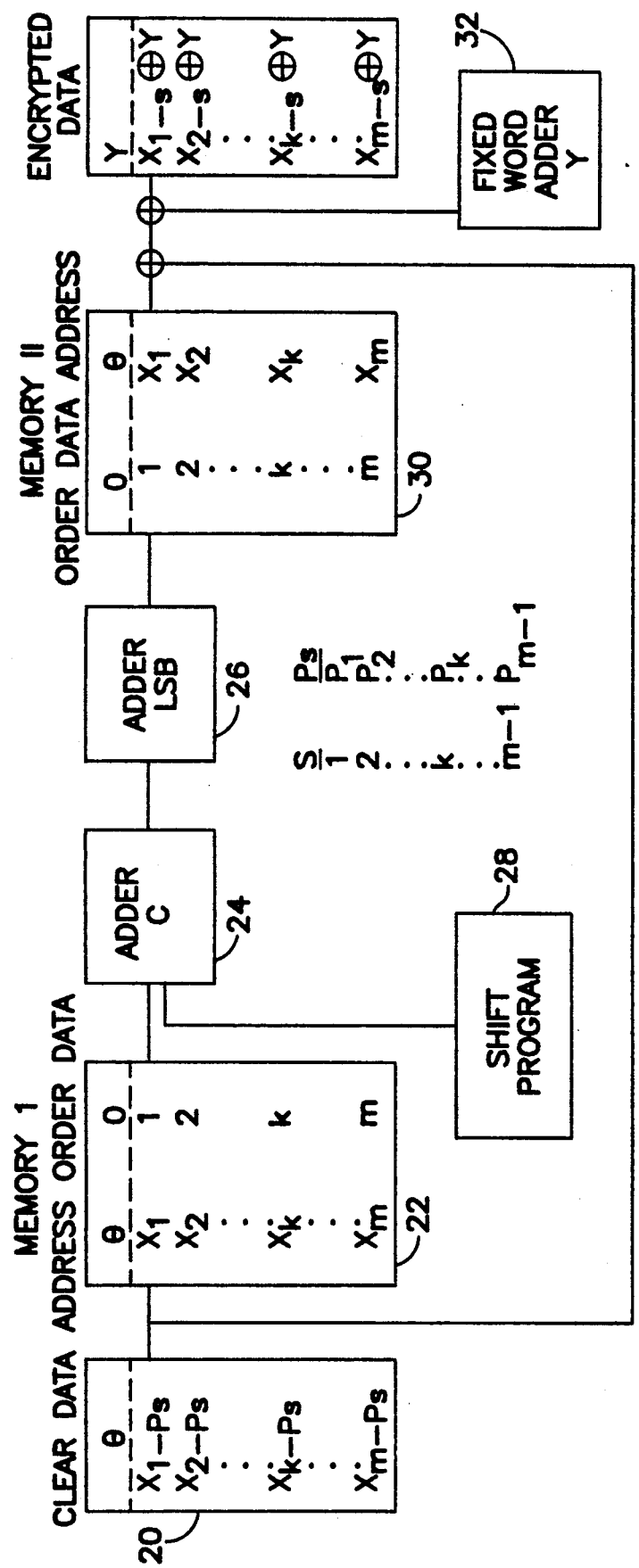
FIG. 11 is a block diagram for an apparatus for encrypting data in accordance with a set of transformation equations such as those of FIG. 10.
Figure 12:
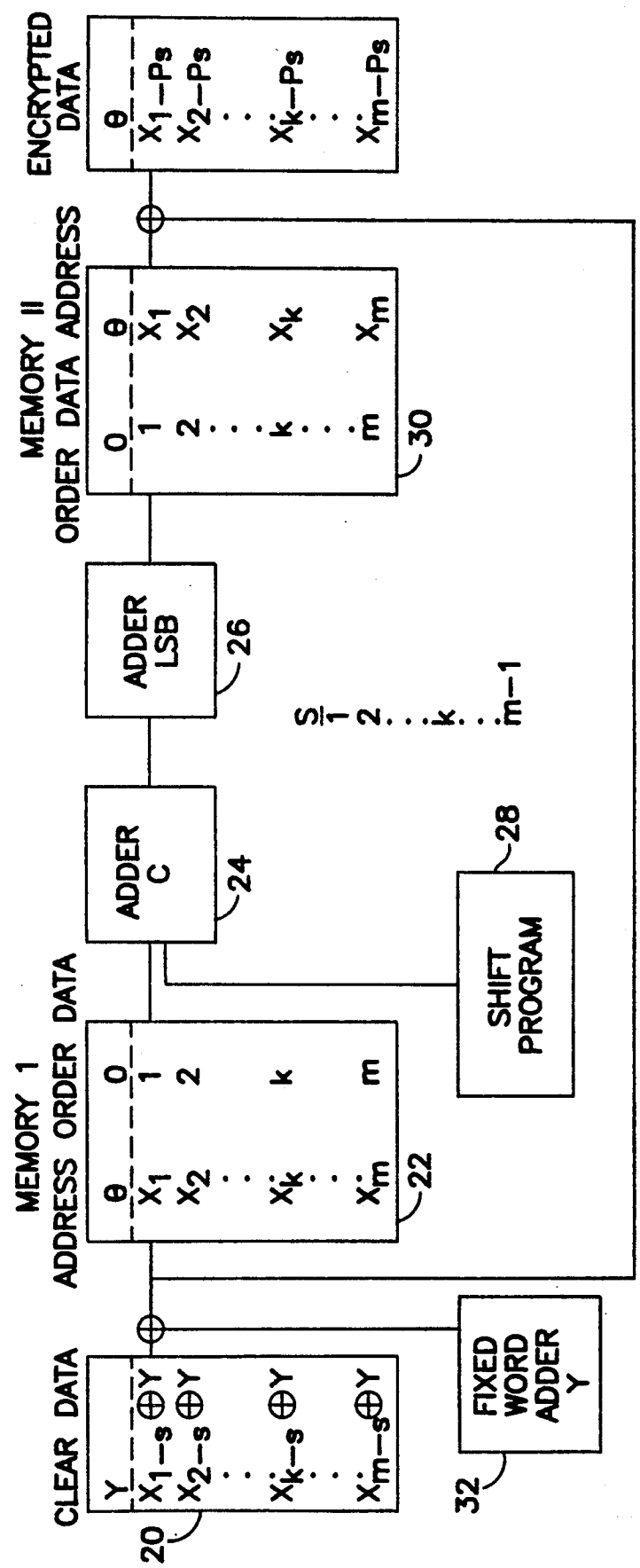
FIG. 12 is a block diagram for an apparatus for decrypting data encrypted with the apparatus of FIG. 11.

Now referring to FIGS. 11 and 12, for any block size a block diagram for carrying out encryption and decryption using a fixed word other than $\theta$, the zero word, may be seen. The procedure is essentially the same as before with the additional step of adding the fixed word Modulo 2 as the last step in the encryption process and the first step in the decryption process.

Figure 13:
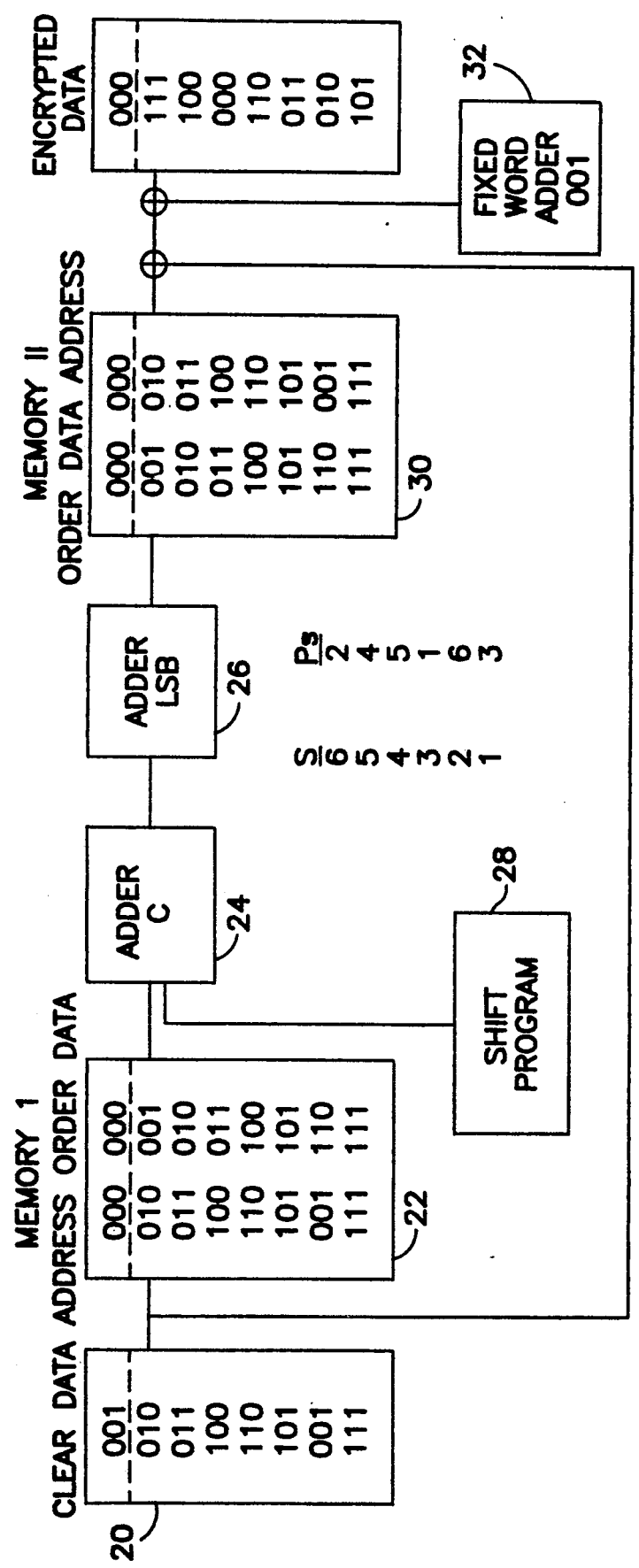
FIG. 13 is an example of encryption using FIG. 11.
Figure 14:
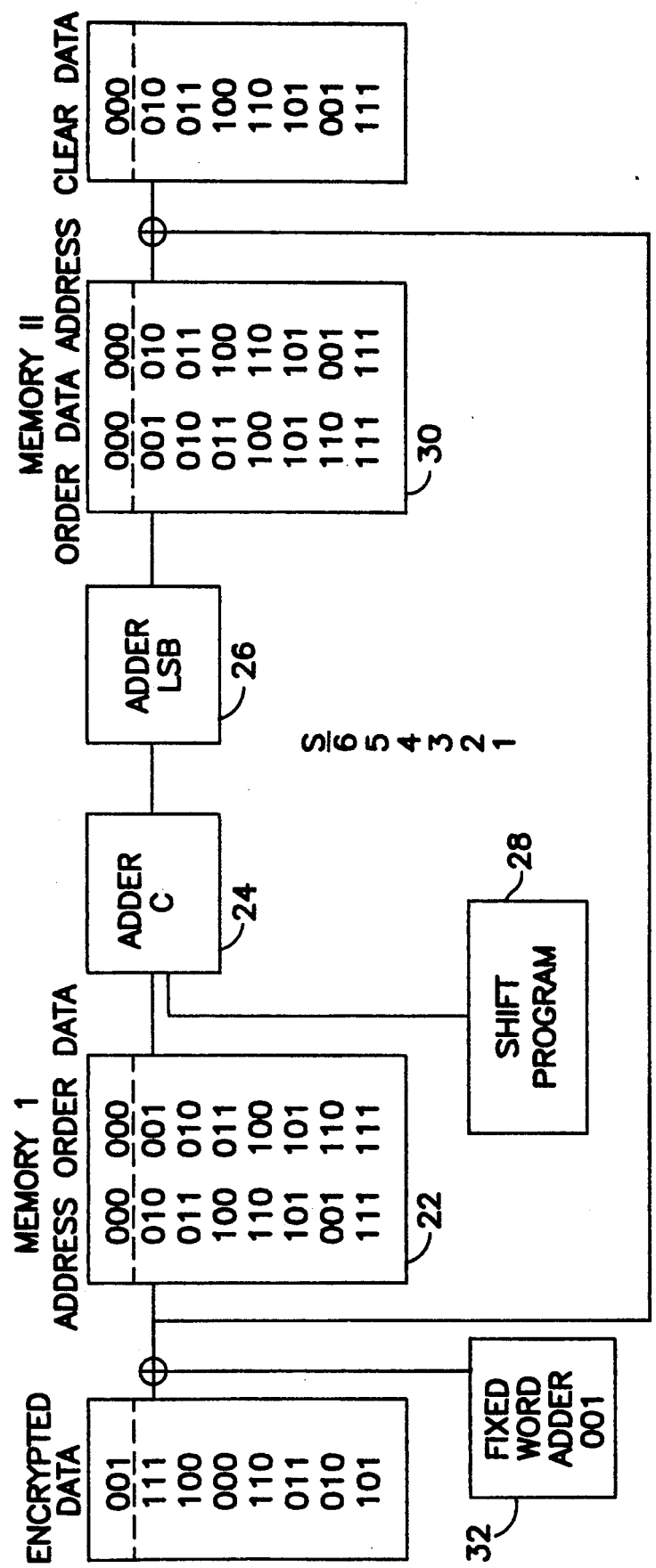
FIG. 14 is an example of encryption using FIG. 12.

An example is shown in FIG. 13 and 14. In this case, no longer remains fixed, but is transformed into 001. Now 110 is transformed to itself and thus becomes fixed in this case. The fixed word adder can add in succession any or all of the n bit words in whatever order is selected by the user. Now referring to FIG. 8, as an example, a block diagram of a system for carrying out encryption in accordance with the encryption and decryption techniques discussed so far may be seen. As shown in the figure, any value of the clear data 20, except 000, is provided as an address to memory 22. Stored at the various memory addresses is the order data for the clear data value, that is, the position, expressed as a binary number, of that clear data value in the ordered sequence of the right column of FIG. 4 (and FIGS. 5 and 10). This position is provided as an output of the memory 22 to an adder shown as the combination of adders 24 and 26. The adders are coupled to add the output of the memory to a value of shift $P_s$ as controlled by shift programmer 28. This addition is not a modulo 2 addition but rather is the normal binary add, with the one exception that the carry from the most significant bit is coupled to the carry in of the least significant bit. Thus, the adder will provide the result 001 as the sum 1 larger than 111, not 1000 or simply 000. Thus, it may be seen that the output of the adders is a new three bit binary number shifted in the order data sequence by an amount $P_s$. This new position is then used as the address for memory 30, which provides as its output the three bit binary number corresponding to the value in column 2 of FIG. 4, or the corresponding clear data value in FIG. 3. Thus, by way of example, if the clear data value is 010, that value as an address to memory I provides the location of that value of 001 in the sequence. If the shift program selects $S=6$, then $P_6=2$ and column 3 is shifted downward two positions from column 2 or by an amount 010. The three bit binary number which would then be adjacent to the clear data value of 010 is 100 as in FIG. 5. This added modulo 2 to the clear data 010 provides an encrypted value of 110, corresponding to the value shown in FIG. 5. However, if the clear text data value is 000, that value as an address to Memory I provides the location of the value of 000 in the sequence. It is not shifted but provided unchanged as the order data in memory 30. Thus 000 added to itself, remains fixed.

The downward shift $P_s$ of the sequence of column 3 of FIG. 5 in comparison to the basic order data of column 2 of FIG. 5 of course corresponds to a complimentary upward shift. Thus, for an n bit block, a downward shift of $P_s$ is equivalent to an upward shift of $m - P_s$. Note also that for a three bit block, all values of possible shift provide the desired one-to-one mapping except for a shift of the first column with respect to the second column of zero, and of 7 and multiples thereof, as such shifts would provide a second column in the matrix having each row the same as the corresponding row of the first column, and any number added to itself modulo 2 will be zero. Thus, for a shift of seven or multiples thereof, all clear data values map to 000, useless for encryption purposes. In general however, it will be shown later that for n bit blocks larger than three bits, all shifts other than zero and integer multiples of m give the desired result and thus are usable in accordance with the original invention.

The block diagram for decryption in accordance with FIG. 7 is shown in FIG. 9. From a hardware standpoint, this diagram is exactly the same as that of FIG. 8 for encryption, the decryption differing only in the shift S applicable for a given shift $P_s$ for encryption. As in the example on page 14, for a shift $P_s$ of 2 for encryption, a shift 6 provides the proper decryption, etc., as shown in the tables of FIGS. 8 and 9. Obviously, the encryption hardware and the decryption hardware must be using the associated shifts for the clear data to be properly recovered on decryption, though the applicable shift may be varied frequently at both ends to make cryptanalysis very difficult, if not virtually impossible.

If one adds modulo 2 a fixed number to any pair of columns of FIG. 5, a still further one-to-one transformation results. By way of example, in FIG. 10 the fixed number 001 has been added modulo 2 to the first and second columns of FIG. 5. Now 010 as a clear text word maps into an encrypted word 111, whereas in the example of FIG. 8, 010 mapped into 110.

An example of a block diagram for the encryption using a fixed word adder may be seen in FIG. 13. This figure is identical to FIG. 8 with the exception that the fixed word adder 32 has been included to add the fixed word (001 in the example) to the output of memory 30 corresponding to the value in the same row of the second column as 010 of the first column. Thus, the fixed word adder merely adds the fixed word (001 in the example) to the column 2 value, after which the clear text word is added modulo 2 thereto to obtain the encrypted data. Again for the example, using clear data of 010 as the address to memory 22, the output of the memory will be 001. Using the same shift as in the example of FIG. 8, 010, $P_s=2$ is added to the 001, to provide an address to memory 30 of 011. This results in an output from memory 30 of 100, to which fixed word adder adds modulo 2, the fixed word 001, yielding 101. This added modulo 2 to the clear text word 010 gives the encrypted word 111 as shown in FIG. 10.

A block diagram for decryption, corresponding to the block diagram for encryption of FIG. 13, is shown in FIG. 14. As may be seen, FIG. 14 is identical to FIG. 13 (though the shifts for decryption are again different from the shifts for encryption), with the exception of the fixed word adder also adding modulo 2 the fixed word to the encrypted data before the same is applied to memory 22. This modulo 2 addition is in essence the second modulo 2 addition of the fixed word, as a first modulo 2 addition of the fixed word was done in FIG. 11 to get the encrypted word. Thus, since a second modulo 2 addition of the same word in effect cancels the first modulo 2 addition so that after the encrypted data in FIG. 12 has the fixed word added modulo 2 thereto, the result of that modulo 2 addition may be used with the equations of FIG. 10 for decryption purposes. Thus, by way of example, using the encrypted word 111 of the example of FIG. 13, 111 $\oplus 001 = 110$ as the address to memory 22 of FIG. 14. This gives a memory output of 100, to which the value of $S=6$ or 110 is added. $100 + 110 = 1010 \rightarrow 011$ with wrap-around. This in turn gives an address of 011 to memory 30 or an output thereof of 100, to which is added modulo 2 110, the address to memory 22, to recover the clear text data 010. Further of course, while the fixed word adder of FIGS. 13 and 14 used a fixed word 001, any other 3-bit fixed word may be used, or for that matter, the fixed word may be varied from time to time with or separate and apart from variations in the shift, a fixed word of 000 essentially reducing the operation of the system to that of FIGS. 8 and 9.

Obviously, the methods described in relation to FIGS. 6, 7, 11 and 12 may readily be carried out with a microprocessor based system under program control. Alternatively, the memory could readily be preprogrammed in read only memory used essentially as look-up tables, and the adders and modulo 2 adders could readily be conventional adder circuitry so that at least the major elements of an encryption and decryption system could be realized in either high speed discrete components or through a custom integrated chip. The shift program also could take various forms depending upon how often a shift is desired, the extent to which the shift order is itself varied, etc., microprocessor based, integrated circuits or other realizations being readily applicable, including shift register implementations as desired.

In the form of a microfiche appendix to the application (including 2 microfiche sheets and 80 frames), Appendices 1-3 are presented for analysis of various block substitution techniques.

In Appendix 1 which is on microfiche not in the text, the transformations hereinbefore described are further analyzed and various properties and characteristics thereof are set forth. In Appendix 2, certain aspects of the method of block substitution of the parent application are reviewed, and the concepts of nonlinearity and nonlinear mappings of clear text to encrypted text (and vice versa) are presented. Nonlinearity in this sense means that the mappings of clear text to encrypted text (and from encrypted text to clear text) are nonlinear under the operation of bit-wise addition modulo 2. In that regard, it was pointed out that FIG. 1 illustrates a many-one transformation of one set of three bit binary numbers to another set of binary numbers by a modulo 2 addition. This specific example maps the eight possible values of the three bit numbers in the first column by modulo 2 addition to six three bit numbers in column 3 representing six of the eight possible combinations, with two (100 and 011), each being repeated twice. Because two three bit numbers (010 and 101) map to the same three bit number (100), and two other three bit numbers (100 and 110) map to the same three bit number (010), the reverse mapping will have ambiguities, making the mapping illustrated in FIG. 1 unsuitable for encryption and decryption purposes.

On the other hand, FIGS. 2 through 5 provide sets of equations for encryption of any of the eight possible three bit clear text words (column 1) to a corresponding non-ambiguous encrypted text word (column 3). These equations remain valid by the interchanging of columns 1 and 3, and thus with this interchange, form the equations for the corresponding decryption in the same way that the equations before the interchange form the equations for encryption. However, the set of equations shown in each of FIGS. 2 through 5 are linear in the sense that the addition of any two equations within a given set of equations (eight equations for three bit numbers such as in FIGS. 2 through 5) is also one of the equations of the set. For instance, in FIG. 2, while the addition of the first or null equation to any other equation yields that other equation and is thus trivial, the addition of the second and third equations provides the fourth equation, the addition of the third and fourth equation provides the second equation, the addition of the fourth and fifth equation provides the eighth equation, etc. Even when one adds modulo 2 one equation to itself, one obtains one of the eight equations, namely the null equation, as may occur when one adds more than two equations modulo 2 such as, by way of example, equations two, three and four, as the addition of equations two and three yields equation four, and equation four added to itself yields the null equation. In that regard, adding two equations modulo 2 may be considered equivalent to adding any greater number of equations, as either or both of the equations added may be considered to be the sum of two or more other equations. Further, there is no combination of equations the sum of which is not another equation in the given set. What is most significant from a cryptanalysis standpoint is that given the right three of the seven equations other than the null equation, the remaining four equations may be determined by the appropriate sums of the combinations of the three known equations. For instance, while the combinations of sums of equations two, three and four of FIG. 2 cannot be used to generate the rest of the equations, equations two, three or four, and five, six, seven or eight can be so used. Taking for example, equations two, four and eight, the sum of equations two and four provides equation three, the sum of equations two and eight provides equation seven, the sum of equations two, four and eight provides equation six, and the sum of equations four and eight provides equation five. Also the foregoing rule, of course, applies to encryption of words of other bit lengths, the generating equations for the sixteen equations for encryption of a four bit word being determined by adding modulo 2 various combinations of four independent equations.

With respect to the set of equations in FIG. 10, adding any two equations does not provide a third equation of the set, though adding 001 to each of the left hand columns of the FIG. 10 again provides the null equation and the rest of the set of equations of FIG. 5, which set is generatable by any three independent equations of the set. It is this ability to generate the remainder of the equations from a basic set of independent equations which the present invention is intended to avoid, the present invention doing so in an orderly and logical manner so that not only may the base set of linear equations be varied from time to time or dynamically in the various ways disclosed in the original application, but the resulting base set may also be nonlinearized from time to time or dynamically to a varying extent and in varying combinations, making cryptanalysis much more difficult than before.

Figures 15, 17:
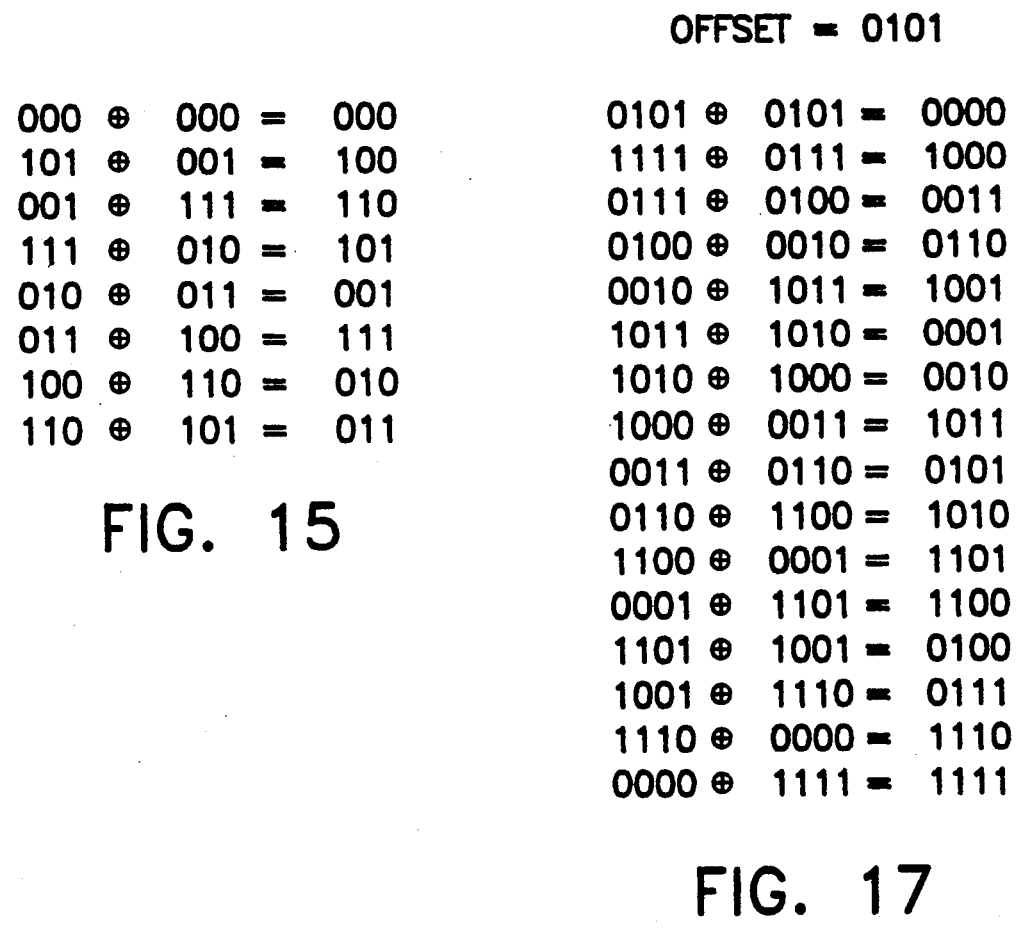

Referring again to FIG. 2, if one rearranges the order of the equations, there is, of course, no change in the mapping of the numbers in column 1 to the numbers in column 3. Accordingly, the equations in FIG. 2 may be rearranged as shown in FIG. 15. In particular, it will be noted that, neglecting the null equation, the first number appearing in column 2 (001) occurs in the next line of column 1, the second number in column 2 (111) occurs in the third line of column 1, etc., the wraparound resulting in the last number in column 2 (101) falling on the first line of column 1 (again neglecting the null equation). The resulting organization of the equations is in the form illustrated on page 7 of Appendix 2, where in FIG. 15, $x_1$ is 001 and $x_m$ is 101. Any set of equations for words (numbers) of any bit length having a null equation and $2^n - 1$ non-zero equations may be so arranged without any changing of the mapping defined thereby, as such an arrangement is a mere changing of the order of appearance of the equations and not a changing of any of the equations themselves.

It is shown in Section 3.2 of Appendix 2 that certain groups of such equations may be altered by rearrangement of the words appearing in columns 1 and 2 to provide correspondingly new modulo 2 addition equations, which when substituted for the original group of equations within the original set of equations still maintains a one to one mapping and thus is suitable for use in encryption and decryption. In that regard, the one to one mapping is preserved because the order of the multibit words appearing in columns 1 and 2 of the selected group of equations is changed, but not the words themselves, so that the group of words mapped and the group of words to which they are mapped by the selected equations has not been changed, though within those two groups, which word in column 1 maps to which word in column 3 has been changed. The net effect of these changed equations is that the same no longer are linear extensions of the unchanged equations, that is, the same can no longer be generated by the addition of two or more of the unchanged equations. This, therefore, breaks up the linearity of the original set, the possible extent of which will be subsequently discussed, making the cryptanalysis more difficult as desired.

It is shown in Section 3.2 of Appendix 2 that under certain conditions, groups of equations within a given set may be altered and used to replace the corresponding original group of equations within the original set so as to maintain a one to one mapping for the complete set, and at the same time break up the linear characteristic of the set of equations as hereinbefore described. These conditions are more specifically illustrated in equation form in Section 3.3 of Appendix 2, wherein the two possible modifications are illustrated in equation form. The basic concept is to take sums of consecutive triples of rows in the original set of equations, with the analysis in Section 3.2 of Appendix 2 showing that, as stated in Section 3.3, the nonlinearization by taking such consecutive triples of rows works if, and only if, a set of only three or four consecutive rows of the original set are used. If three consecutive rows are used, four rows are actually modified, namely the three consecutive rows of the original set, together with a fourth row corresponding to the vector sum modulo 2 of the three consecutive rows. The modification can be obtained by adding vectorially to each of the four rows, the following equation:

$$(x_1 \oplus x_2) \oplus (x_1 \oplus x_2) = \Theta$$

If four consecutive rows of the original set of linear equations are used, six rows of the original set of equations are modified, namely the four consecutive rows, together with the row representing the vector sum of the first three of the four consecutive rows, and the row corresponding to the vector sum of the last three of the four consecutive rows of the original set (e.g. the row corresponding to the sum of rows 1, and 3, and the row corresponding to the sum of rows 2, 3 and 4, as shown in 3.3 of Appendix 2). The modification in this case may be obtained by adding vectorially to the corresponding six rows the following:

| to rows 1 and q | $(x_1 \oplus x_2) \oplus (x_1 \oplus x_2) = \Theta$ |
| to rows 2 and 3 | $(x_1 \oplus x_3) \oplus (x_1 \oplus x_3) = \Theta$ |
| to rows 4 and q + 1 | $(x_2 \oplus x_3) \oplus (x_2 \oplus x_3) = \Theta$ |

The form of the equations above and the original equations shown in 3.3 of page A2 of Appendix 2 suggests that nonlinearization works if one takes the first, second, third and one other row of the original set of linear equations, or alternatively, if one takes the first, second, third, fourth and two other rows of the original set of linear equations. Since the method works because the equations in the original set as selected for modification are linear within themselves, equations once nonlinearized by the methods of the present invention may not be again used as part of the nonlinearization process. This would tend to suggest that only four or six equations could be nonlinearized by this process, which of course would be an insignificant number of the total equations for larger word sizes (for instance, a four bit word requires 16 equations, an eight bit word 256 equations, etc.). However, again referring to FIG. 15, it is to be noted that which word or number in column 2 is to be selected from the non-null rows as $x_1$ is arbitrary. By way of example, if one selected 011 as $x_1$ rather than 001, the third non-zero line would become the first, the fourth non-zero line the second, the fifth non-zero line the third, the sixth non-zero line the fourth, the seventh non-zero line the fifth, the first non-zero line the sixth, etc., essentially shifting the lower five equations up and wrapping the upper two non-zero equations around, with the result that the equations themselves are not changed, nor is the ordering of the equations, but rather only the starting point in that sequence is changed. Such an arrangement of equations was shown in FIG. 3, wherein $x_1 = 100$ and $x_m (=x_7) = 011$. Thus the equations presented in 3.3 of Appendix 2 are general in the sense that if three consecutive rows and the row corresponding to the sum of the three consecutive rows are to be modified (nonlinearized) any three consecutive rows may be so selected, limited only by the fact that none of the three selected nor the row corresponding to the sum of the three can have previously been nonlinearized as a result of an earlier selection. Similarly, if four consecutive rows plus the two sum rows hereinbefore described are selected, any four consecutive rows may be so used, again provided that none of the four selected nor of the two sum rows may have previously been nonlinearized by this process. To generalize the equations for nonlinearization, one need only consider $x_1$ as being the value in the second column of the first of the three or four successive rows selected, and renumbering values in each column accordingly.

It will be noted that the nonlinearization process is carried out on the equations other than the null equations. Since there are $2^n - 1$ such equations, wherein n is the bit length of the word used, there is necessarily an odd number of equations available for nonlinearization regardless of the value of n, whereas the nonlinearization process nonlinearizes an even number (4 or 6) equations at a time (obviously in a high speed system, apparatus may be provided to simultaneously nonlinearize different non-overlapping groups of a given set of linear equations, as the nonlinearization processes for non-overlapping groups are totally mutually independent, regardless of which process is used). Thus, it is clear that not all equations in any given linear set may be nonlinearized. Consequently, there is a question as to how many of the equations may be nonlinearized, and whether there is a logical manner of selecting equations for nonlinearization. These considerations are discussed in Sections 3.4 through 3.6 of Appendix 2. In general, while not all equations may be nonlinearized, normally a vast majority of the equations may be nonlinearized for word sizes of four or more bits, leaving the remaining nonlinearized equations of little significance, and perhaps if anything, possibly misleading from a cryptanalysis viewpoint. Further of course, it should be noted that varying from time to time or dynamically varying the number and identification of the rows to be nonlinearized and which nonlinearization technique is used further compounds the cryptanalysis problem, though such time varying or dynamically varying nonlinearization is not that difficult from a hardware standpoint (or software standpoint, if done under software control) as the starting set of linear equations (which themselves may be varied from time to time or dynamically, as herein before described) may be generated from a simple and readily variable generating function, which set of equations may be nonlinearized in both manner and extent utilizing logical processes, which manner and extent may each themselves be varied from time to time or dynamically.

As an example of the foregoing, attention is directed to table 1 of Appendix A of Appendix 2) which provides the sixteen equations for the linear mapping of a four bit number or word to another four bit number or word utilizing a specific generating function. Note that these sixteen equations are organized in the manner indicated for the original equations in 3.3 of Appendix 2. As noted in Appendix of Appendix 2 it is easily verified that the sum of any two of the sixteen equations in table 1 is another of the sixteen equations in accordance with the concept of linearity as used herein. Table 1 is nonlinearized and is presented in its nonlinearized form in table 15 of Appendix A of Appendix 2. In particular, the nonlinearization is in accordance with the first method, namely, utilizing three consecutive rows of the original set of equations (neglecting the null equation), plus the row representing the sum of the first three rows. In that regard, the sum modulo 2 of the first three non-zero numbers in column 1 (1001, 0001 and 0010) is equal to 1010, the value in the eleventh row of the non-zero equations. Thus rows one, two, three and eleven are nonlinearized by adding modulo 2 $x_1 \oplus x_2$ to each of columns 1 and 2 thereof. To be more specific, $x_1$ equals 0001 and $x_2$ equals 0010, so that $x_1 \oplus x_2 = 0011$. Adding modulo 2 0011 to the first equation gives $1010 \oplus 0010 = 1000$ (1000 is the original value in column 3 for the first equation) as shown in table 15 of Appendix C of Appendix 2. The same addition for the equations on lines 2, 3 and 11 carries out the transformation for these four lines. Similarly, if one adds lines 5, 6 and 7 of the non-zero equations, one obtains the equation of line 15 of the non-zero equations, the last non-zero equation shown on page A1. These four lines may be nonlinearized in the same manner as lines one, two, three and eleven, noting however that the applicable equation is effectively now:

$$(x_5 \oplus x_6) \oplus (x_5 \oplus x_6) = \Theta$$

With respect to further nonlinearization of the set of sixteen equations shown in Table 15 of Appendix C of Appendix 2, there are two other series of three consecutive equations in the table, specifically, lines 8, 9 and 10 and 12, 13 and 14 which might be considered. The modulo 2 sum of lines 8, 9 and 10 however, provide line 3 of the non-zero equations, a line already used, and the modulo 2 sum of lines 12, 13 and 14 provide line 7, another line already used. Accordingly, while two additional groups of three consecutive lines or three consecutive equations exist, the same cannot be used for further nonlinearization because the sum of either of the three is a line or equation which has already been nonlinearized.

As another example, note table 4 set out in Appendix A of Appendix 2 hereof. This set of linear equations uses the same generating function but as applied to a new base ($x_1 - 0011$, $x_2 - 0110$, $x_3 - 1100$, $x_4 = 1000$) which when nonlinearized using the same set of equations as in the previous example (equations 1, 2, 3, 5, 6, 7, 11 and 15) provides the nonlinear set of equations set out below Table 4 of Appendix A of Appendix 2.

Finally, as a third example, note the example shown in Table 17 of Appendix C in Appendix 2 with the nonlinearized equations shown in Table 18 of Appendix C. This example is an example of another nonlinearization of the table of 15 equations (together with the null equation) presented in Table 1 of Appendix A of Appendix 2, nonlinearized using a different basis, specifically four successive (non-zero) equations 1, 2, 3 and 4 together with the sum of 1, 2 and 3, namely equation 11, and the sum of equations 2, 3 and 4, namely equation 12, together with the three successive equations 13, 14 and 15 and the sum thereof, equation 8. The equations for nonlinearizing four consecutive equations plus the two modulo 2 sum equations of course have been given before herein and are set out in 3.3 of Appendix 2. In particular, three different equations are used, one for rows 1 and q, one for rows 2 and 3, and one for rows 4 and q+1. By way of example, taking row 1, zero is added to column 3 and $x_1 \oplus x_2$ is added modulo 2 to each of columns 1 and 2 (the modulo 2 sum of anything to itself equalling zero). Since $x_1 \oplus x_2 = 0011$, adding this to equation 1 yields the equation $1010 \oplus 0010 = 1000$, the first non-zero equation in the nonlinearized set of equations in Table 18 of Appendix C of Appendix 2. For row 2 of the linear set of non-zero equations, $x_1 \oplus x_3$ is added to each of columns 1 and 2, namely $0001 \oplus 0100 = 0101$. Adding this to columns 1 and 2 of row 2 of the linear set of equations in Table 1 of Appendix A in Appendix 2 yields the fifth non-zero equation in the set of equations in Table 18 thereof. Finally, as an example of the use of the third equation for rows 4 and q+1, $x_2 \oplus x_3 = 0010 \oplus 0100 = 0110$. Adding this, for example, to columns 1 and 2 of row 4 of the linear non-zero equations yields row 2 of the non-zero equations in the nonlinearized set of equations in Table 18. Of course all six of the applicable rows must be modified in accordance with the nonlinearization process. Thus, in this latter example, 10 of the equations are nonlinearized instead of the 8 in the prior example, and of course the resulting mapping from column 1 to column 3 is generally quite different for the two sets of equations.

Finally, the nonlinearized equations may be further modified by adding modulo 2 an offset to each of the first two columns. This, of course, is equivalent to adding the offset modulo 2 to itself which of course is 0 and therefore does not affect the numbers in the third column. By way of specific example, FIG. 17 presents the set of equations of the third example described above and shown table 18 of Appendix 2 as modified by the addition of the offset 0101 to the first and second columns.

Figure 16:
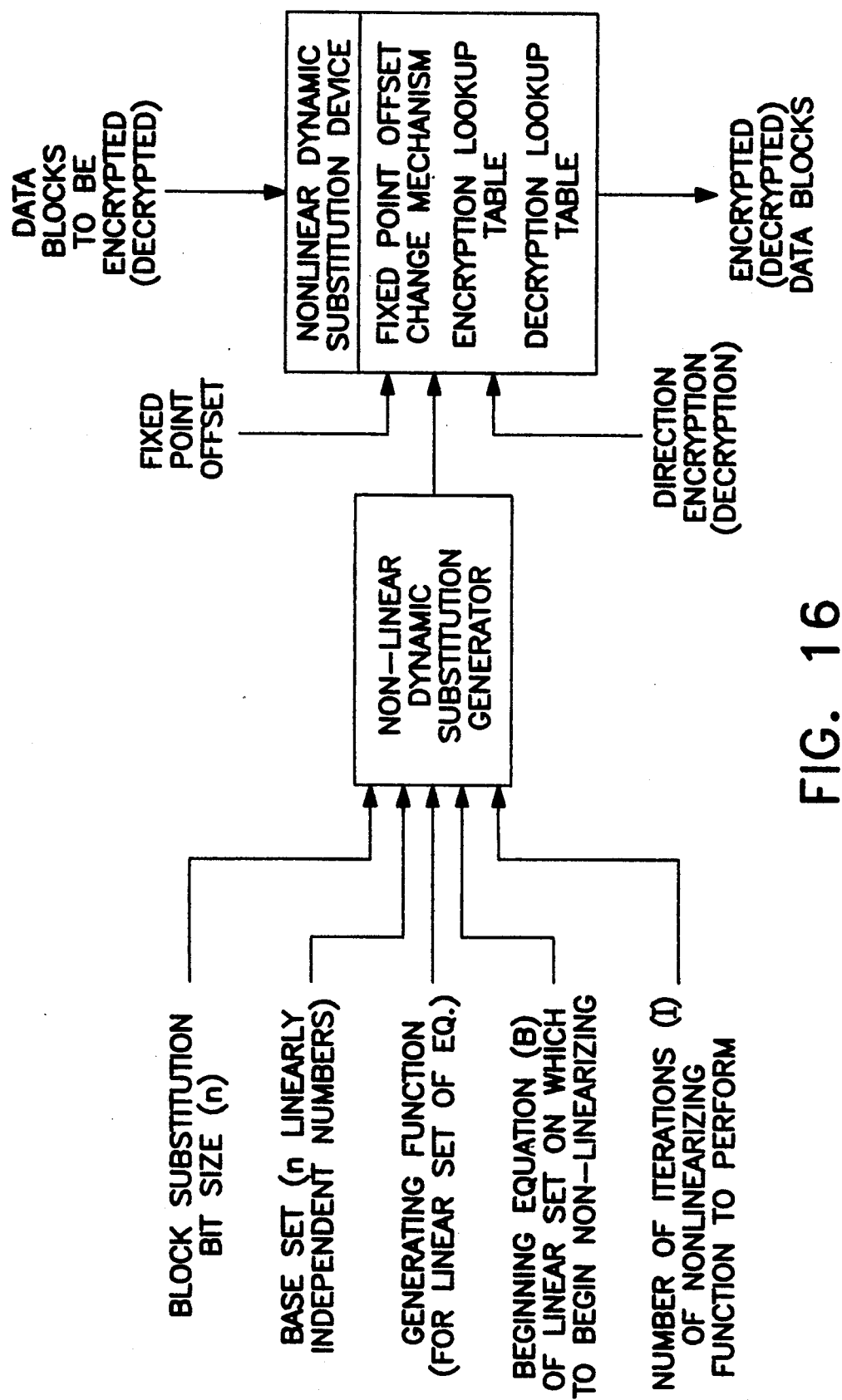
FIG. 16 is a block diagram of a system for encryption and decryption in accordance with the present invention.

FIG. 16 shows a block diagram of typical apparatus for encryption and decryption in accordance with the present invention. As may be seen in FIG. 16, it is convenient to ultimately use a look-up table in the form of a read/write memory wherein the clear text data block or the encrypted text data block (both n bits long) is presented in parallel as the address to the memory with the data stored at the corresponding address corresponding to the encryption or decryption of the respective data block, respectively. For that purpose, it may be convenient to use a memory of twice the address space of that required for either encryption or decryption (e.g. n+1 address bits) so that the memory address range is one bit wider than the data block to be operated on. In this manner, one bit of the memory address may be used to designate whether the operation is to be an encryption or a decryption operation. By way a specific example, the most significant bit of the memory address might be 0 to indicate a decryption process or a 1 to indicate an encryption process, with the decryption data stored in the lower half of the address range of the memory and the encryption data stored in the upper address range of the memory. Thus both encryption and decryption may be done as desired by the look-up table by control of the single bit, and encryption or decryption of a block of n bits may be achieved in a single memory cycle.

Assuming that the mappings for encryption and decryption are to be changed periodically and/or dynamically, some method of altering the contents of the look-up table must be provided. While this could be done by specialized hardware, it is convenient to do the same by an appropriate processor under program control, as the alteration of the encryption and decryption schemes normally will occur far less frequently than the encryption and decryption process itself must be carried out. Accordingly, the same normally need not be accomplished with the same speed as encryption and decryption itself. Accordingly, the nonlinear dynamic substitution generator shown in FIG. 16 may operate under program control based on various inputs thereto. In particular, the equation for encryption may readily be generated under program control given certain basic information defining the same, such as by way of example the block substitution bit size (n), the base set of n linearly independent numbers, the generating function, the beginning equation of the linear set on which to begin nonlinearizing, and the number of iterations of the nonlinearizing function to perform.

Once the offset has been applied to the nonlinearized equations, each number or block in column 3 is stored in the portion of the look-up table assigned to encryption at an address equal to the block in column 1 for the respective row. Thus, when a number or block in column 1 is applied as the address, the number read out of the memory is the number in column 3 for that row representing the respective encrypted block. For the decryption portion of the table, the process is reversed, in that the blocks in columns 3 are used as memory addresses (more appropriately address portions, the full address including the address bit designating decryption) with the data stored at those addresses being the respective blocks in column 1. Thus, during decryption the memory is entered at the address defined by the encrypted block, with the data stored at the respective address being provided as the output corresponding to the associated clear text block. For convenience, detailed methods for encrytion and decryption are set out in Appendix 3.

Obviously the encryption and decryption processes could be carried out entirely under program control, as both processes simply involve logical manipulations given certain (variable) starting information. However, the speed with which encryption and decryption could be carried out would be very grossly reduced, as the processor would wind up regenerating the same encryption and decryption equations over and over again. In comparison, the use of the look-up table allows a one time determination of the full set of encryption and decryption equations, which information for any data block to be encrypted or de-encrypted is continuously available in a single memory cycle until such time as the equations are to be changed.

While a preferred embodiment for the encryption and decryption of the present invention has been disclosed and described herein, it will be obvious to one skilled in the art that various changes in form and detail may be made therein without departing from the spirit and scope of the invention.

What is claimed is:

1. A method of encryption by substituting for any one of the $2^n$ unique clear text books of n bit binary numbers an associated unique encrypted block of n bit binary numbers comprising the steps of:

(a) finding a first matrix of $2^n$ equations, each equation representing the modulo 2 addition of one of the $2^n$ clear text blocks with a unique one of $2^n$ bit numbers to provide an associated unique intermediate n bit block, all of the equations in the first matrix of $2^n$ equations being characterized by the vector sum modulo 2 of any number of the equations also being one of the equations in the first matrix, the equations including the null equation $\Theta \oplus \Theta = \Theta$ and the remaining $2^n - 1$ equations being orderable as follows:

| Equation # | | | | |
|---|---|---|---|---|
| 1 | $x_m$ | $\oplus$ | $x_1$ | = $x_{1-p}$ |
| 2 | $x_1$ | $\oplus$ | $x_2$ | = $x_{2-p}$ |
| . | . | . | . | . |
| j | $x_{j-1}$ | $\oplus$ | $x_j$ | = $x_{j-p}$ |
| . | . | . | . | . |
| m | $x_{m-1}$ | $\oplus$ | $x_m$ | = $x_{m-p}$ | where $m = 2^n - 1$ (b) modifying a plurality of the nonzero $2^n - 1$ equations in the first matrix of $2^n$ equations to provide a second matrix of $2^n$ equations, the plurality of equations being modified so that the modified plurality of equations collectively map the same clear text blocks to the same unique n bit intermediate blocks as the corresponding unmodified equations, but each in a different manner so that each of the modified equations in the plurality is not the sum modulo 2 of any number of the unmodified equations left over and not included in the modified plurality of equations; the second matrix of $2^n$ equations consisting of the modified plurality and the remaining unmodified equations from the first matrix of $2^n$ equations; and (c) for each clear text block to be encrypted, adding modulo 2 to that block, the unique one of the $2^n$ n bit numbers associated therewith in accordance with the associated equation of the second matrix of $2^n$ equations to obtain the encrypted block.

2. The method of claim 1 wherein step (b) further comprises the step of adding modulo 2 an offset to each of the blocks in the first and second columns of the first matrix after modifying a plurality of the nonzero $2^n - 1$ equations in the first matrix of $2^n$ equations to provide the second matrix.

3. The method of claim 1 or 2 wherein in step (b), a plurality of the equations in the first matrix of $2^n$ equations which are to be modified begins with a first set of three consecutive equations, and a fourth equation which is the vector sum modulo 2 of the three consecutive equations, the equations being modified by adding vectorially to each of the four equations, the following equation:

$$(x_1 \oplus x_2) \oplus (x_1 \oplus x_2) = \Theta,$$

wherein for purposes of the foregoing equations of the first set the first matrix of unmodified equations is ordered so that the first of the three consecutive equations is $$x_m \oplus x_1 = x_{1-p}.$$

4. The method of claims 1 or 2 wherein in step (b), a plurality of the equations in the first matrix of $2^n$ equations which are to be modified begins with a first set of four consecutive equations, a fifth equation which is the vector sum modulo 2 of the first three of the four consecutive equations, and a sixth equation which is the vector sum modulo 2 of the last three of the four consecutive equations, the equations being modified by adding vectorially to the six equations, the following equations:

to equations 1 and q $(x_1 \oplus x_2) \oplus (x_1 \oplus x_2) = \Theta$ to equations 2 and 3 $(x_1 \oplus x_3) \oplus (x_1 \oplus x_3) = \Theta$ to equations 4 and q+1 $(x_2 \oplus x_3) \oplus (x_2 \oplus x_3) = \Theta$ wherein for purposes of the foregoing equations of the first set the first matrix of equations are ordered so that the first of the four consecutive equations is $$x_m \oplus x_1 = x_{1-p}.$$

5. The method of claim 3, wherein the fourth equation is $$x_{q-1} \oplus x_1 = x_{q-p},$$

being equation #q, for some number q, in the first matrix of unmodified equations; followed by a second set of three consecutive equations and a fourth equation of the second set which is the vector sum modulo 2 of the three consecutive equations of the second set, the equations being modified by adding vectorially to each of the four equations of the second set, the following equation:

$$(x_{1+d} \oplus x_{2+d}) \oplus (x_{1+d} \oplus x_{2+d}) = \Theta$$

wherein for purposes of the foregoing equations of the second set the first matrix of unmodified equations are ordered so that the first of the three consecutive equations is:

$$x_d \oplus x_{1+d} = x_{1+d-p}$$

and the fourth equation is $$x_{d+q-1} \oplus x_{d+q} = x_{d+q-p}$$

being equation #d+q, for some number d+q, in the first matrix of unmodified equations, where d is greater than 2; followed by subsequent selections of three consecutive equations and repetitions of this process as desired or until some equation from the first matrix of $2^n$ unmodified equations is selected a second time, so that the second matrix of $2^n$ equations consists of the plurality of modified equations plus the remaining equations from the first matrix of $2^n$ equations which were not modified.

6. The method of claim 4, wherein the fifth and sixth equations are $$x_{q-1} \oplus x_q = x_{q-p}$$

$$x_q \oplus x_{q+1} = x_{q+1-p}$$

being equation #q and q+1, for some number q, in the first matrix of unmodified equations, followed by a second set of four consecutive equations, a fifth equation of the second set which is the vector sum modulo 2 of the first three of the four consecutive equations of the second set, and a sixth equation of the second set which is the vector sum modulo 2 of the last three of the four consecutive equations of the second set, the equations being modified by adding vectorially to the six equations, the following equations;

to equations 1+d and q+d
$$(x_{1+d} \oplus x_{2+d}) \oplus (x_{1+d} \oplus x_{2+d}) = \Theta$$

to equations 2+d and 3+d
$$(x_{1+d} \oplus x_{3+d}) \oplus (x_{1+d} \oplus x_{3+d}) = \Theta$$

to equations 4+d and q+1+d
$$(x_{2+d} \oplus x_{3+d}) \oplus (x_{2+d} \oplus x_{3+d}) = \Theta$$

wherein for purposes of the foregoing equations of the second set the first matrix of equations are ordered so that the first of the four consecutive equations is $$x_d \oplus x_{1+d} = x_{1+d-p},$$

and the fifth and sixth equations are $$x_{q+d-1} \oplus x_{q+d} \times x_{q+d-p}$$

$$x_{q+d} \oplus x_{q+d+1} = x_{q+d+1-p}$$

being equations #q+d and q+d+1 for some number q+d, where d is greater than 3, in the first matrix of unmodified equations, followed by subsequent selections of four consecutive equations and repetitions of this process as desired or until some equation from the first matrix of $2^n$ unmodified equations is selected a second time, so that the second matrix of $2^n$ equations consists of the plurality of modified equations plus the remaining equations from the first matrix of $2^n$ equations which were not modified.

* * * * *

UNITED STATES PATENT AND TRADEMARK OFFICE
CERTIFICATE OF CORRECTION

PATENT NO. : 5,214,704
DATED : May 25, 1993
INVENTOR(S) : Mittenthal

It is certified that error appears in the above-identified patent and that said Letters Patent is hereby corrected as shown below:

In column 2 at line 6 delete "Pate.", insert --Pats.--

In column 2 at line 8 delete "systems they"
insert --systems as they--

In column 17 at line 46 delete "text books"
insert --text blocks--.

Signed and Sealed this

Twenty-fifth Day of July, 1995

Attest:

BRUCE LEHMAN

Attesting Officer    Commissioner of Patents and Trademarks

UNITED STATES PATENT AND TRADEMARK OFFICE
CERTIFICATE OF CORRECTION

PATENT NO. : 5,214,704
DATED      : May 25, 1993
INVENTOR(S) : Lothrop Mittenthal It is certified that error appears in the above-identified patent and that said Letters Patent is hereby corrected as shown below:

In column 20 at line 32 delete

" $x_{q+d-1} \oplus x_{q+d} \times x_{q+d-p}$ "

insert

-- $x_{q+d-1} \oplus x_{q+d} = x_{q+d-p}$ --

Signed and Sealed this

Seventh Day of September, 1999

Q. TODD DICKINSON

Attest:

Attesting Officer

Acting Commissioner of Patents and Trademarks